United States Patent
Karri et al.

(10) Patent No.: US 11,829,485 B2
(45) Date of Patent: Nov. 28, 2023

(54) DETECTING SECURITY VULNERABILITIES IN SOFTWARE CONTAINERS

(71) Applicant: International Business Machines Corporation, Armonk, NY (US)

(72) Inventors: Venkata Vara Prasad Karri, Visakhapatnam (IN); Sarbajit K. Rakshit, Kolkata (IN); Shailendra Moyal, Pune (IN); Pavan Kumar Penugonda, Anakapalle (IN)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 17/444,478

(22) Filed: Aug. 5, 2021

(65) Prior Publication Data

US 2023/0037616 A1     Feb. 9, 2023

(51) Int. Cl.
    *G06F 21/00*    (2013.01)
    *G06F 21/57*    (2013.01)
    *G06F 21/53*    (2013.01)
    *G06F 8/60*     (2018.01)

(52) U.S. Cl.
    CPC ......... *G06F 21/577* (2013.01); *G06F 21/53* (2013.01); *G06F 8/60* (2013.01); *G06F 2221/033* (2013.01)

(58) Field of Classification Search
    CPC .......... G06F 21/577; G06F 21/53; G06F 8/60; G06F 2221/033; G06F 8/63; G06F 8/71; G06F 21/44; G06F 21/64
    See application file for complete search history.

(56) References Cited

U.S. PATENT DOCUMENTS

| | | | |
|---|---|---|---|
| 10,503,895 B2 | 12/2019 | Chen | |
| 10,936,717 B1 | 3/2021 | Herman Saffar | |
| 2017/0109536 A1* | 4/2017 | Stopel | G06F 21/577 |
| 2018/0167217 A1* | 6/2018 | Brady | H04L 67/10 |
| 2019/0068360 A1* | 2/2019 | Bhattacharya | G06F 21/64 |
| 2020/0082095 A1 | 3/2020 | Mcallister | |
| 2021/0312037 A1* | 10/2021 | Revivo | G06F 21/53 |
| 2021/0397891 A1* | 12/2021 | Memon | H04L 9/3239 |
| 2022/0171856 A1* | 6/2022 | Bhatt | G06F 21/577 |

FOREIGN PATENT DOCUMENTS

CN     111723370 A     9/2020

OTHER PUBLICATIONS

"Runtime Security for Containers, Cloud and Kubernetes", Sysdig, downloaded from the Internet on May 14, 2021, 13 pages.

(Continued)

*Primary Examiner* — Ghazal B Shehni
(74) *Attorney, Agent, or Firm* — Andre Adkins (57) ABSTRACT

Approaches presented herein enable detection of security vulnerabilities in software containers. More specifically, a software container comprising a build script and a base image is received. An instance of the software container is instantiated in an encapsulated environment using the build script and the base image. The instance of the software container is executed in the encapsulated environment, and the execution of the software container instance is monitored in the encapsulated environment to detect one or more security vulnerabilities.

17 Claims, 4 Drawing Sheets

(56) References Cited

OTHER PUBLICATIONS

Dhawn et al., "Dev-Sec-Ops—Security and Test Automation", Mitre, Mar. 20, 2019, 42 pages.

Heinz, Martin, "Analyzing Docker Image Security", Towards Data Science, Apr. 1, 2020, 10 pages, <https://towardsdatascience.com/analyzing-docker-image-security-ed5cf7e93751>.

Jefford-Baker, Jonathan, "Alcol: Probabilistic Threat Modelling of the Amazon Elastic Container Service Domain", KTH Royal Institute of Technology School of Electrical Engineering and Computer Science, Master in Computer Science, Date: Jul. 2, 2019, 108 pages.

Singh, Saurabh, "How to build application inside and outside Docker. Dockerfile structure and commands.", Oct. 8, 2018, 14 pages, <https://medium.com/@saurabh.singh0829/how-to-build-application-inside-and-outside-docker-dockerfile-structure-and-commands-f542b58cd830>.

Vizard, Mike, "SentinelOne Automates DevSecOps in Kubernetes Environments", Container Journal, Sep. 18, 2020, 5 pages, <https://containerjournal.com/features/sentinelone-automates-devsecops-in-kubernetes-environments/>.

Vizard, Mike, "Sysdig Injects More AI into Container Security", Container Journal, Aug. 6, 2019, 6 pages, <https://containerjournal.com/topics/container-security/sysdig-injects-more-ai-into-container-security/>.

Rohling et al., "Standardized Container Virtualization Approach for Collecting Host Intrusion Detection Data", Proceedings of the Federated Conference on Computer Science and Information Systems, pp. 459-463, DOI: 10.15439/2019F212 ISSN 2300-5963 ACSIS, vol. 18, IEEE Catalog No. CFP1985N-ART © 2019, PTI. Downloaded from the Internet on Sep. 23, 2023.

\* cited by examiner

DETECTING SECURITY VULNERABILITIES IN SOFTWARE CONTAINERS

TECHNICAL FIELD

The present invention relates generally to detecting security vulnerabilities in software containers and, more specifically, to monitoring the execution of an instance of a software container to detect security vulnerabilities.

BACKGROUND

Containers are standard units of software that package up code and their dependencies, so that an application runs quickly and reliably in disparate computing environments. Although containers have a number of security advantages, there are also security vulnerabilities with containers.

SUMMARY

Approaches presented herein enable detection of security vulnerabilities in software containers. More specifically, a software container comprising a build script and a base image is received. An instance of the software container is instantiated in an encapsulated environment using the build script and the base image. The instance of the software container is executed in the encapsulated environment, and the execution of the software container instance is monitored in the encapsulated environment to detect one or more security vulnerabilities.

One aspect of the present invention includes a method for detecting security vulnerabilities in software containers, comprising: receiving a software container, wherein the software container comprises a build script and a base image, instantiating an instance of the software container in an encapsulated environment using the build script and the base image, executing the instance of the software container in the encapsulated environment, and monitoring the execution of the instance of the software container in the encapsulated environment to detect one or more security vulnerabilities.

Another aspect of the present invention includes a computer system for detecting security vulnerabilities in software containers, the computer system comprising: a memory medium comprising program instructions, a bus coupled to the memory medium, and a processor, for executing the program instructions, coupled to a software container security vulnerability detection engine via the bus that when executing the program instructions causes the system to: receive a software container, wherein the software container comprises a build script and a base image, instantiate an instance of the software container in an encapsulated environment using the build script and the base image, execute the instance of the software container in the encapsulated environment, and monitor the execution of the instance of the software container in the encapsulated environment to detect one or more security vulnerabilities.

Yet another aspect of the present invention includes a computer program product for detecting security vulnerabilities in software containers, the computer program product comprising a computer readable hardware storage device, and program instructions stored on the computer readable hardware storage device, to: receive a software container, wherein the software container comprises a build script and a base image, instantiate an instance of the software container in an encapsulated environment using the build script and the base image, execute the instance of the software container in the encapsulated environment, and monitor the execution of the instance of the software container in the encapsulated environment to detect one or more security vulnerabilities.

Still yet, any of the components of the present invention could be deployed, managed, serviced, etc., by a service provider who offers to detect security vulnerabilities in software containers in a computer system.

Embodiments of the present invention also provide related systems, methods, and/or program products.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining,"

"evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide for detection of security vulnerabilities in software containers. More specifically, a software container comprising a build script and a base image is received. An instance of the software container is instantiated in an encapsulated environment using the build script and the base image. The instance of the software container is executed in the encapsulated environment, and the execution of the software container instance is monitored in the encapsulated environment to detect one or more security vulnerabilities.

Figure 1:
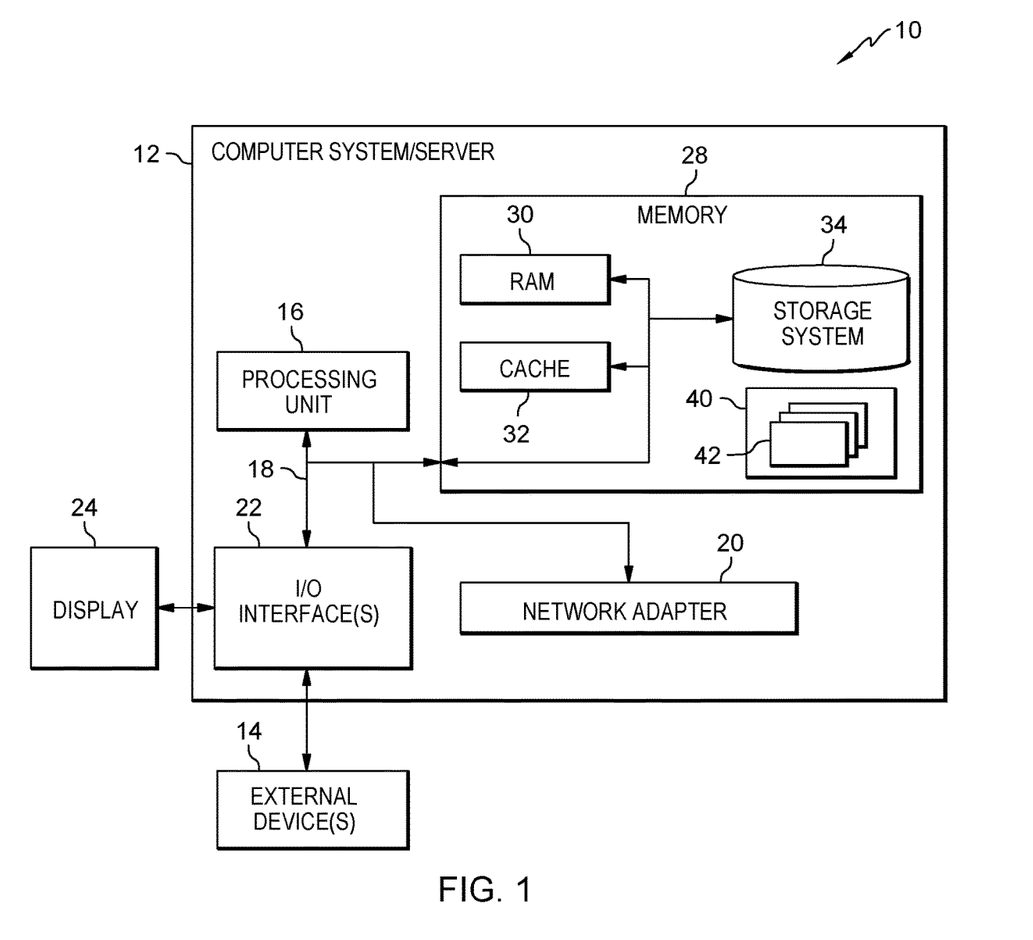
FIG. 1 shows an architecture in which the invention may be implemented according to illustrative embodiments.

Referring now to FIG. 1, a computerized implementation 10 of an embodiment for detecting security vulnerabilities in software containers will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system/server 12, which is operational with numerous other (e.g., special purpose) computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system/server 12 is intended to demonstrate that some or all of the components of implementation 10 could be deployed, managed, serviced, etc., by a service provider who offers to implement, deploy, and/or perform the functions of the present invention for others.

Computer system/server 12 is intended to represent any type of computer system that may be implemented in deploying/realizing the teachings recited herein. Computer system/server 12 may be described in the general context of computer system/server executable instructions, such as program modules, being executed by a computer system. Generally, program modules may include routines, programs, objects, components, logic, data structures, and so on, that perform particular tasks or implement particular abstract data types. In this particular example, computer system/server 12 represents an illustrative system for detecting security vulnerabilities in software containers. It should be understood that any other computers implemented under the present invention may have different components/software, but can perform similar functions.

Computer system/server 12 in computerized implementation 10 is shown in the form of a computing device. The components of computer system/server 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for detecting security vulnerabilities in software containers, which is stored in memory 28, storage system 34, and/or program/utility 40. While executing computer program code, processing unit 16 can read and/or write data to/from memory 28, storage system 34, and program/utility 40.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and/or an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

The inventors of the present invention have found that software containers have a number of security advantages, but there are also security vulnerabilities with containers.

Accordingly, the inventors of the present invention have developed a system that detects security vulnerabilities in software containers by monitoring the execution of an instance of a software container in an encapsulated environment.

Figure 2A:
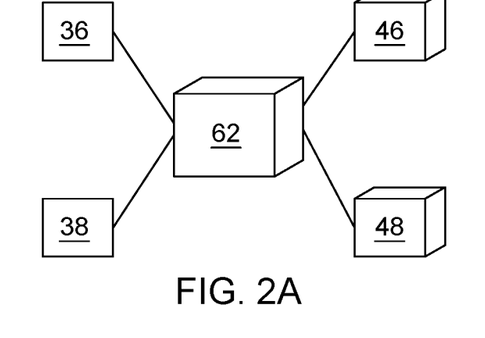
FIG. 2A shows a system diagram describing software container instantiation according to illustrative embodiments.

Referring now to FIG. 2A, a system diagram describing software container instantiation and subdivision is shown. In one embodiment, build script 36 is a series of commands, instructions, and arguments that are used to resolve external references to software libraries, system tools, settings, and the like, in base image 38, so as to build and instantiate software container instance 62. As will be described herein below with respect to FIG. 2B, if hardcoded credentials are detected in software container instance 62, a subdivision of software container instance 62 into confidential software container instance 46 that contains the hardcoded credentials, and non-confidential software container instance 48 may be performed.

Figure 2B:
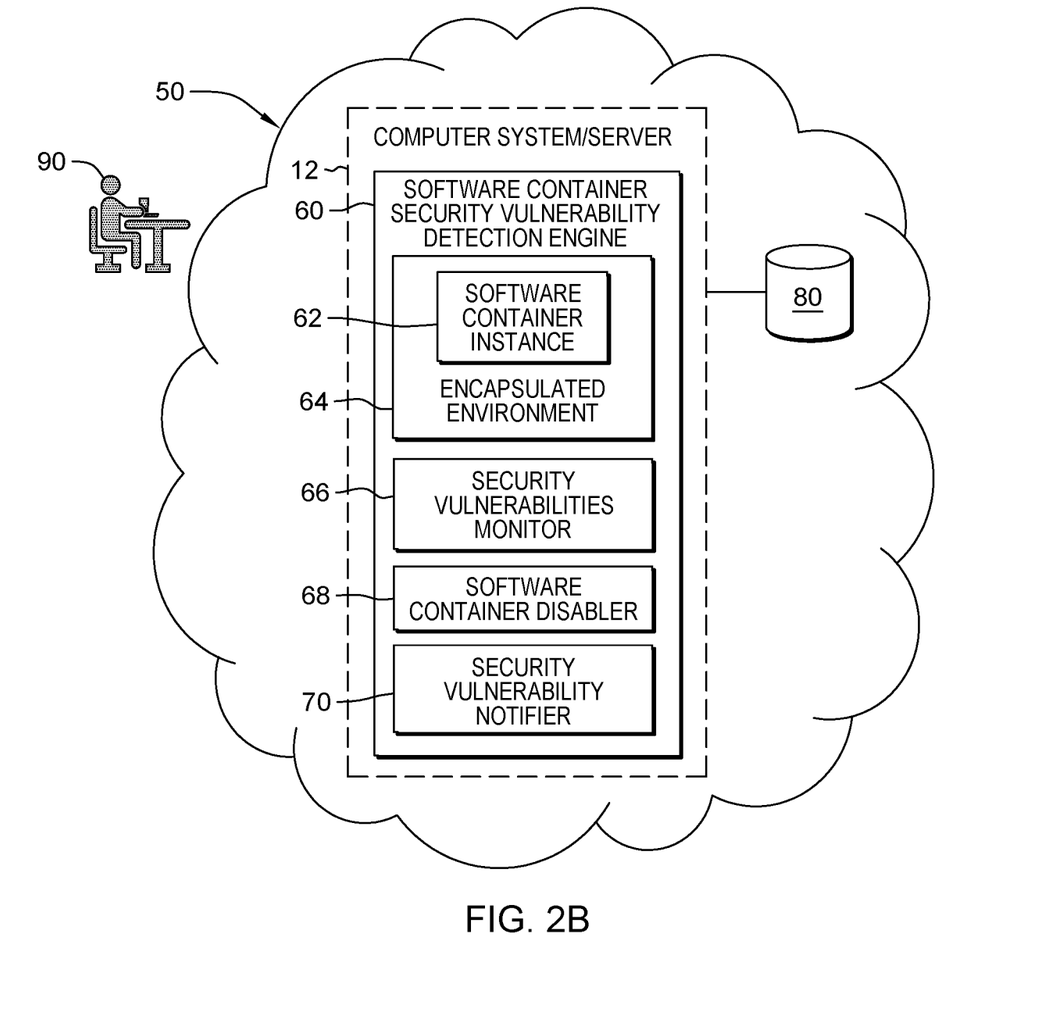
FIG. 2B shows a system diagram describing the functionality discussed herein according to illustrative embodiments.

Referring now to FIG. 2B, a system diagram describing the functionality discussed herein according to an embodiment of the present invention is shown. It is understood that the teachings recited herein may be practiced within any type of computing environment, including, but not limited to, a networked computing environment (e.g., a cloud computing environment 50). A stand-alone computer system/server 12 is shown in FIG. 2B for illustrative purposes only. In the event the teachings recited herein are practiced in a networked computing environment, each client need not have a software container security vulnerability detection engine 60 (hereinafter "system 60"). Rather, all or part of system 60 could be loaded on a server or server-capable device that communicates (e.g., wirelessly) with the clients to provide for detecting security vulnerabilities in software containers. Regardless, as depicted, system 60 is shown within computer system/server 12. In general, system 60 can be implemented as program/utility 40 on computer system 12 of FIG. 1 and can enable the functions recited herein.

Along these lines, system 60 may perform multiple functions. Specifically, among other functions, system 60 can detect security vulnerabilities in software containers in a networked computing environment. To accomplish this, system 60 can include a set of components (e.g., program modules 42 of FIG. 1) for carrying out embodiments of the present invention. These components can include, but are not limited to, software container instance 62, encapsulated environment 64, security vulnerabilities monitor 66, software container disabler 68, and security vulnerability notifier 70. Through computer system/server 12, system 60 can communicate with common vulnerabilities and exposures (CVE) database 80 and user 90.

According to some embodiments of the present invention, system 60 can detect security vulnerabilities in software containers by receiving a software container comprising build script 36 and base image 38 (shown in FIG. 2A). Software container instance 62 may be instantiated in encapsulated environment 64 using build script 36 and base image 38 (shown in FIG. 2A). Encapsulated environment 64 is an isolated environment (also known as a test bed, test environment, or sand box) that can be used to safely execute software container instance 62 without potential security vulnerabilities being able to interact with production systems or networks.

Security vulnerabilities monitor 66 may monitor the execution of software container instance 62 in encapsulated environment 64 to detect one or more security vulnerabilities by matching one or more characteristics of software container instance 62 with one or more security vulnerabilities stored in common vulnerabilities and exposures (CVE) database 80. A public CVE database is maintained by The MITRE Corporation, and is sponsored by the U.S. Department of Homeland Security (DHS), and the Cybersecurity and Infrastructure Security Agency (CISA). (CVE is a registered trademark of The MITRE Corporation.)

As mentioned herein above with respect to FIG. 2A, if hardcoded credentials (e.g. passwords, access credentials, and the like) are detected in software container instance 62, a subdivision of software container instance 62 into at least confidential software container instance 46 and non-confidential software container instance 48 may be performed.

In any event, if one or more security vulnerabilities are detected in software container instance 62, software container disabler 68 may disable software container instance 62 from being deployed or further used by flagging software container instance 62 as having characteristics of one or more security vulnerabilities, or listing software container instance 62 in a security vulnerabilities database.

If one or more security vulnerabilities are detected in software container instance 62, one or more characteristics of software container instance 62 may be stored in a blockchain distributed ledger as described herein below with respect to FIG. 3. Moreover, a smart contract associated with the blockchain distributed ledger may be used to determine if software container instance 62 may be deployed or otherwise further utilized. A series of rules may be implemented and used in the smart contract to determine if one or more security vulnerabilities detected in software container instance 62 render software container instance 62 unacceptable for production use. Alternatively, the series of rules may also be used to determine if the one or more security vulnerabilities detected in software container instance 62 will likely have a minimal impact on an enterprise's security posture, therefore allowing software container instance 62 to be used in a production environment.

If it is determined that the one or more security vulnerabilities detected in software container instance 62 render software container instance 62 unacceptable for production use, user 90 (e.g. a system administrator or programmer) may be notified of the one or more security vulnerabilities.

Figure 3:
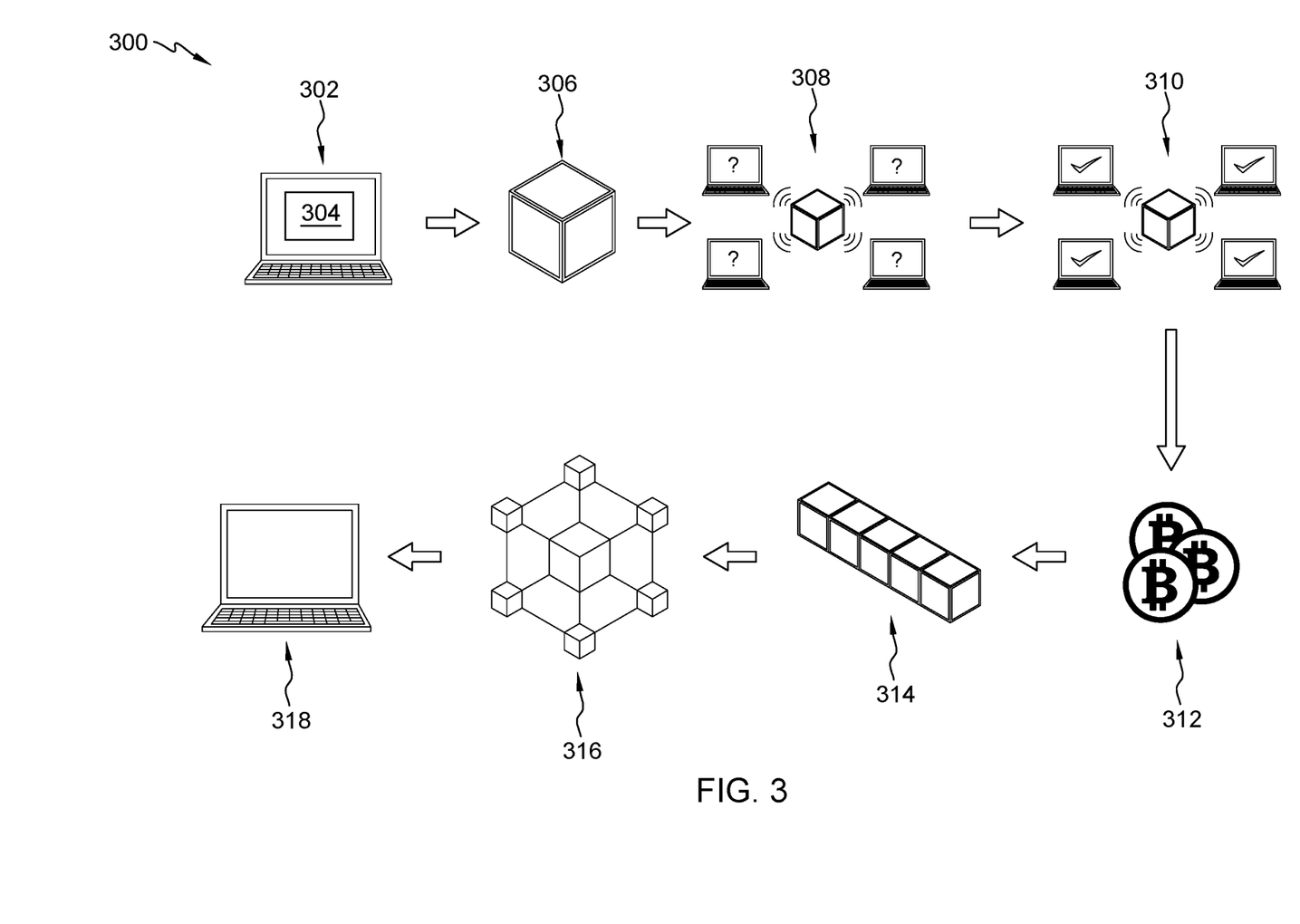
FIG. 3 shows a process flowchart for performing a smart contract blockchain transaction according to illustrative embodiments.

Referring now to FIG. 3 in connection with FIG. 2A and FIG. 2B, a process flowchart 300 for performing a smart contract blockchain transaction is shown. At 302, smart contract blockchain transaction 304 is requested and authenticated. At 306, a block representing that transaction is created. At 308, the block is sent to each of the participating nodes in the distributed ledger network. At 310, the nodes in the distributed ledger network to which the block was sent validate the transaction. At 312, the participating nodes receive a reward for proof of work, in one example, in Bitcoin cryptocurrency. At 314, the block is added to an existing blockchain. At 316, the update to the blockchain is distributed across the network to the participating nodes in the distributed ledger network. At 318, the blockchain transaction is complete. Although this example depicts a smart contract blockchain transaction, many other types of transactions may be handled by blockchain.

Figure 4:
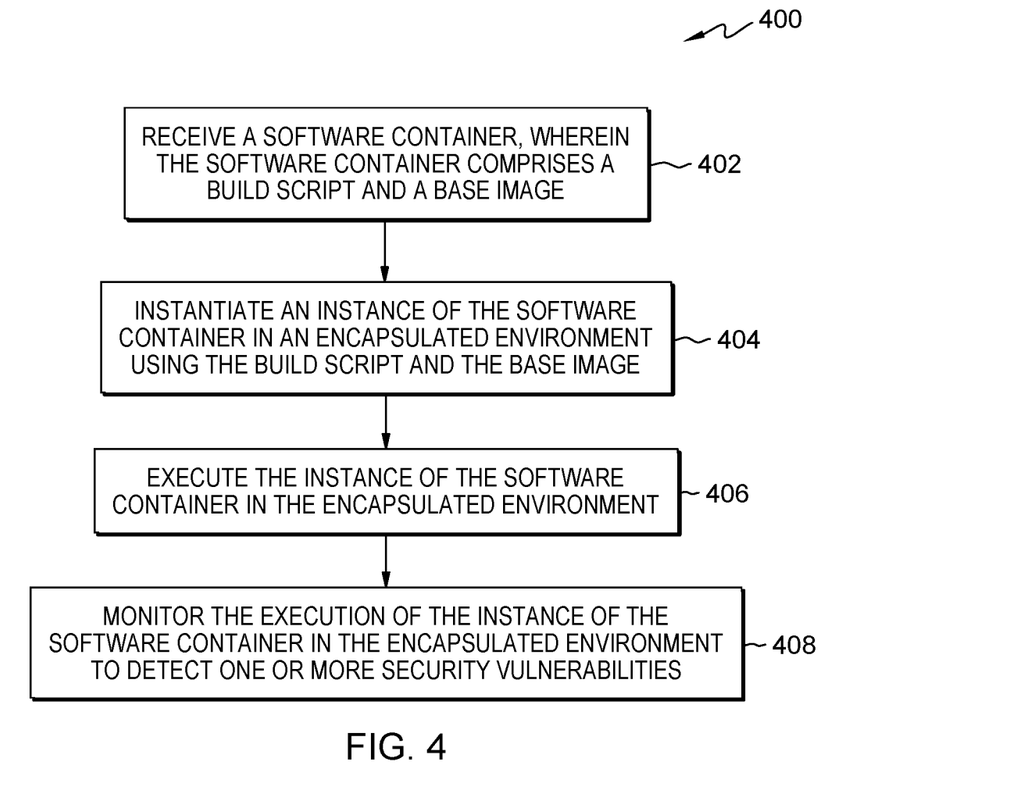
FIG. 4 shows a process flowchart for detecting security vulnerabilities in software containers according to illustrative embodiments.

As depicted in FIG. 4, in one embodiment, a system (e.g., computer system/server 12) carries out the methodologies disclosed herein. Shown is a process flowchart 400 for detecting security vulnerabilities in software containers. At 402, a software container comprising a build script and a base image is received. At 404, an instance of the software container is instantiated in an encapsulated environment using the build script and the base image. At 406, the instance of the software container is executed in the encapsulated environment. At 408, the execution of the software container instance is monitored in the encapsulated environment to detect one or more security vulnerabilities.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for detecting security vulnerabilities in software containers. Thus, embodiments herein disclose a process for supporting computer infrastructure, comprising integrating, hosting, maintaining, and deploying computer-readable code into a computing system (e.g., computer system/server 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for detecting security vulnerabilities in software containers. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is apparent that there has been provided herein approaches to detect security vulnerabilities in software containers. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method for detecting security vulnerabilities in software containers, comprising:
    receiving a software container, wherein the software container comprises a build script and a base image;
    instantiating an instance of the software container in an encapsulated environment using the build script and the base image;
    executing the instance of the software container in the encapsulated environment;
    monitoring the execution of the instance of the software container in the encapsulated environment to detect one or more security vulnerabilities;
    responsive to detecting one or more security vulnerabilities, storing one or more characteristics of the software container instance in a blockchain distributed ledger; and
    utilizing a smart contract associated with the blockchain distributed ledger to determine if the software container instance may be deployed.

2. The computer-implemented method of claim 1, wherein the monitoring comprises:
    matching one or more characteristics of the software container instance with one or more security vulnerabilities.

3. The computer-implemented method of claim 2, wherein the one or more security vulnerabilities comprise one or more vulnerabilities stored in a common vulnerabilities and exposures (CVE) database.

4. The computer-implemented method of claim 1, the method further comprising:
    responsive to detecting hardcoded credentials in the software container instance, subdividing the software container instance into at least a confidential software container instance and a non-confidential software container instance.

5. The computer-implemented method of claim 1, the method further comprising:
    responsive to detecting one or more security vulnerabilities, disabling a deployment of the software container instance.

6. The computer-implemented method of claim 1, the method further comprising:
    responsive to detecting one or more security vulnerabilities, notifying a user of the one or more security vulnerabilities.

7. A computer system for detecting security vulnerabilities in software containers, the computer system comprising:
    a memory medium comprising program instructions;
    a bus coupled to the memory medium; and
    a processor, for executing the program instructions, coupled to a software container security vulnerability detection engine via the bus that when executing the program instructions causes the system to:
    receive a software container, wherein the software container comprises a build script and a base image;
    instantiate an instance of the software container in an encapsulated environment using the build script and the base image;
    execute the instance of the software container in the encapsulated environment;
    monitor the execution of the instance of the software container in the encapsulated environment to detect one or more security vulnerabilities;
    responsive to detecting one or more security vulnerabilities, storing one or more characteristics of the software container instance in a blockchain distributed ledger; and
    utilize a smart contract associated with the blockchain distributed ledger to determine if the software container instance may be deployed.

8. The computer system of claim 7, wherein the program instructions to monitor comprise:
    matching one or more characteristics of the software container instance with one or more security vulnerabilities.

9. The computer system of claim 8, wherein the one or more security vulnerabilities comprise one or more vulnerabilities stored in a common vulnerabilities and exposures (CVE) database.

10. The computer system of claim 7, the instructions further causing the system to:
    responsive to detecting hardcoded credentials in the software container instance, subdivide the software container instance into at least a confidential software container instance and a non-confidential software container instance.

11. The computer system of claim 7, the instructions further causing the system to:
    responsive to detecting one or more security vulnerabilities, disable a deployment of the software container instance.

12. The computer system of claim 7, the instructions further causing the system to:
    responsive to detecting one or more security vulnerabilities, notify a user of the one or more security vulnerabilities.

13. A computer program product for detecting security vulnerabilities in software containers, the computer program product comprising a computer readable hardware storage device, and program instructions stored on the computer readable hardware storage device, to:
    receive a software container, wherein the software container comprises a build script and a base image;
    instantiate an instance of the software container in an encapsulated environment using the build script and the base image;
    execute the instance of the software container in the encapsulated environment;

monitor the execution of the instance of the software container in the encapsulated environment to detect one or more security vulnerabilities;

responsive to detecting one or more security vulnerabilities, store one or more characteristics of the software container instance in a blockchain distributed ledger; and utilize a smart contract associated with the blockchain distributed ledger to determine if the software container instance may be deployed.

14. The computer program product of claim 13, wherein the program instructions to monitor comprise:

matching one or more characteristics of the software container instance with one or more security vulnerabilities.

15. The computer program product of claim 14, wherein the one or more security vulnerabilities comprise one or more vulnerabilities stored in a common vulnerabilities and exposures (CVE) database.

16. The computer program product of claim 13, the computer readable storage device further comprising instructions to:

responsive to detecting hardcoded credentials in the software container instance, subdivide the software container instance into at least a confidential software container instance and a non-confidential software container instance.

17. The computer program product of claim 13, the computer readable storage device further comprising instructions to:

responsive to detecting one or more security vulnerabilities, disable a deployment of the software container instance; and notify a user of the one or more security vulnerabilities.

* * * * *